US012581342B2

(12) United States Patent
You et al.

(10) Patent No.: US 12,581,342 B2
(45) Date of Patent: Mar. 17, 2026

(54) MDT METHOD AND APPARATUS

(71) Applicant: HUAWEI TECHNOLOGIES CO., LTD., Shenzhen (CN)

(72) Inventors: Chunhua You, Shanghai (CN); Xiaoli Shi, Shanghai (CN); Qufang Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 493 days.

(21) Appl. No.: 17/986,490

(22) Filed: Nov. 14, 2022

(65) Prior Publication Data

US 2023/0077862 A1     Mar. 16, 2023

Related U.S. Application Data

(63) Continuation of application No. PCT/CN2021/093601, filed on May 13, 2021.

(30) Foreign Application Priority Data

May 15, 2020     (CN) .......................... 202010411921.2

(51) Int. Cl.
| | |
|---|---|
| *H04W 24/10* | (2009.01) |
| *H04B 17/318* | (2015.01) |
| *H04W 24/02* | (2009.01) |
| *H04W 72/542* | (2023.01) |
| *H04W 74/0808* | (2024.01) |

(52) U.S. Cl.
CPC .......... *H04W 24/10* (2013.01); *H04B 17/318* (2015.01); *H04W 24/02* (2013.01); *H04W 72/542* (2023.01); *H04W 74/0808* (2013.01)

(58) Field of Classification Search
CPC ... H04W 24/10; H04W 24/02; H04W 72/542; H04W 74/0808; H04W 24/08; H04W 76/27; H04W 16/14; H04B 17/318
See application file for complete search history.

(56) References Cited

U.S. PATENT DOCUMENTS

| | | | |
|---|---|---|---|
| 10,348,425 B2 | 7/2019 | Fukuta et al. | |
| 2013/0190009 A1* | 7/2013 | Johansson | H04W 4/029 |
| | | | 455/456.1 |

(Continued)

FOREIGN PATENT DOCUMENTS

| | | |
|---|---|---|
| CN | 102231894 A | 11/2011 |
| CN | 104955098 A | 9/2015 |

(Continued)

OTHER PUBLICATIONS

International Search Report and Written Opinion issued in PCT/CN2021/093601, dated Aug. 11, 2021, 11 pages.

(Continued)

*Primary Examiner* — Mohamed A Kamara

(57) ABSTRACT

A minimization of drive tests (MDT) method and apparatus includes: a network device sends MDT configuration information to a terminal, where the MDT configuration information includes an MDT measurement parameter of a shared spectrum; and the terminal performs MDT on the shared spectrum based on the MDT configuration information to obtain a measurement report, and sends the measurement report to the network device. The MDT may be performed on a shared spectrum to obtain a measurement report. The measurement report may better reflect an application status of the shared spectrum, to help optimize a network device that performs communication by using the shared spectrum.

20 Claims, 7 Drawing Sheets

(56)        References Cited

U.S. PATENT DOCUMENTS

| | | | | |
|---|---|---|---|---|
| 2013/0190011 A1* | 7/2013 | Kim | ..................... | H04W 64/00 |
| | | | | 455/456.1 |
| 2016/0270121 A1* | 9/2016 | Bergström | ........ | H04W 74/0833 |
| 2018/0206128 A1 | 7/2018 | Perez et al. | | |
| 2021/0345405 A1 | 11/2021 | Kim et al. | | |
| 2022/0346174 A1* | 10/2022 | Wang | ................... | H04W 76/18 |
| 2023/0077269 A1* | 3/2023 | Liu | ..................... | H04B 17/318 |

FOREIGN PATENT DOCUMENTS

| | | | | | |
|---|---|---|---|---|---|
| CN | 106211204 A | 12/2016 | | | |
| CN | 106899988 A | 6/2017 | | | |
| CN | 107371168 A | 11/2017 | | | |
| CN | 110169115 A | 8/2019 | | | |
| CN | 110249570 A | 9/2019 | | | |
| CN | 111586712 A | 8/2020 | | | |
| KR | 20200035822 A | 4/2020 | | | |
| WO | 2015109516 A1 | 7/2015 | | | |
| WO | WO-2016173212 A1 * | 11/2016 | ........... | H04W 24/10 | |
| WO | 2021159544 A1 | 8/2021 | | | |

OTHER PUBLICATIONS

Kyocera, MDT considerations for NG-RAN. 3GPP TSG-RAN WG2 #106, Reno, USA May 13-17, 2019, R2-1906657, 4 pages.
Extended European Search Report dated Sep. 15, 2023 issued for European Application No. 21804527.6 (12 pages).

* cited by examiner

MDT METHOD AND APPARATUS

CROSS-REFERENCE TO RELATED APPLICATIONS

This application is a continuation of Internal Application No. PCT/CN2021/093601, filed on May 13, 2021, which claims priority to Chinese Patent Application No. 202010411921.2, filed on May 15, 2020. The disclosures of the aforementioned applications are hereby incorporated by reference in their entireties.

TECHNICAL FIELD

Embodiments of this disclosure relate to the communications field, and in particular, to an MDT method and an apparatus.

BACKGROUND

Minimization of drive tests (MDT) is mainly using a radio access network to coordinate a terminal to measure and report corresponding information, so that an operator detects a problem in the radio access network and optimizes the radio access network based on the information reported by the terminal.

A conventional MDT method is mainly for a radio access network that performs communication by using a licensed spectrum. For example, a network device in a radio access network that performs communication by using a licensed spectrum may send MDT configuration information to a terminal in a radio resource control (RRC) idle mode or an RRC inactive mode, and the terminal may perform MDT on the licensed spectrum based on the MDT configuration information received by the terminal.

However, to extend an air interface resource of a network device and improve a data throughput of the network device, in some radio access networks, the network device may not only perform communication by using a licensed spectrum, but also perform communication by using an unlicensed spectrum. The unlicensed spectrum is also referred to as a shared spectrum. For example, a new radio (NR) system may perform communication by using a licensed spectrum or a shared spectrum.

A new technical solution is expected, to facilitate better optimization of a network device that performs communication by using a shared spectrum.

SUMMARY

Embodiments of this disclosure provide an MDT method and an apparatus, to perform MDT on a shared spectrum to obtain a measurement report. The measurement report may better reflect an application status of the shared spectrum, to help optimize a network device that performs communication by using the shared spectrum.

According to a first aspect, an MDT method is provided. The method may be performed by a communication apparatus. The communication apparatus may be a terminal, or may be a chip or a system-on-a-chip deployed in the terminal. The method includes: The communication apparatus receives MDT configuration information from a network device, where the MDT configuration information includes an MDT measurement parameter of a shared spectrum, performs MDT on the shared spectrum based on the MDT configuration information to obtain a measurement report, and sends the measurement report to the network device.

According to a second aspect, an MDT method is provided. The method may be performed by a communication apparatus. The communication apparatus may be a network device, or may be a chip or a system-on-a-chip deployed in the network device. The method includes: The communication apparatus sends MDT configuration information to a terminal, where the MDT configuration information includes an MDT measurement parameter of a shared spectrum, and receives a measurement report that is obtained by the terminal by performing MDT on the shared spectrum based on the MDT configuration information.

According to a third aspect, a communication apparatus is provided. The communication apparatus includes a unit or means configured to perform the steps in the first aspect.

According to a fourth aspect, a communication apparatus is provided. The communication apparatus includes a unit or means configured to perform the steps in the second aspect.

According to a fifth aspect, a communication apparatus is provided. The communication apparatus includes a processor and an interface circuit. The processor is configured to: communicate with another apparatus through the interface circuit, and perform the method provided in the first aspect or the second aspect.

According to a sixth aspect, a communication apparatus is provided. The communication apparatus includes a processor. The processor is connected to a memory, and is configured to invoke a program stored in the memory, to perform the method provided in the first aspect or the second aspect. The memory may be located inside the communication apparatus, or may be located outside the communication apparatus.

According to a seventh aspect, a communication apparatus is provided. The communication apparatus includes a processor and a memory. The processor is configured to perform the method provided in the first aspect or the second aspect.

According to an eighth aspect, a terminal is provided, and includes the communication apparatus provided in the third aspect.

According to a ninth aspect, a network device is provided, and includes the communication apparatus provided in the fourth aspect.

According to a tenth aspect, a computer-readable storage medium is provided, and configured to store instructions. When the instructions are executed by a processor of an electronic device, the electronic device is enabled to implement the method provided in the first aspect or the second aspect.

According to an eleventh aspect, a computer program is provided. When the computer program is executed by a processor, the method provided in the first aspect or the second aspect is performed.

According to a twelfth aspect, a computer program product is provided. The computer program product may include the computer-readable storage medium provided in the tenth aspect. The computer-readable storage medium includes the program provided in the eleventh aspect.

According to a thirteenth aspect, a communication system is provided. The communication system includes the terminal according to the eighth aspect and the network device according to the ninth aspect.

In the foregoing aspects, the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may exist independently outside the processor.

In the foregoing aspects, the communication apparatus may include one or more processors, and may include one or more memories. The memory may be integrated with the processor, or the memory and the processor are disposed separately. In a specific implementation process, the memory and the processor may be integrated on a same chip, or may be separately disposed on different chips. A type of the memory and a manner of disposing the memory and the processor are not limited in embodiments of this disclosure.

In the foregoing aspects, an information transmission or receiving process may be a process in which the processor receives and sends information. For example, a process of sending the measurement report may be that the processor outputs the measurement report, and a process of receiving the MDT configuration information may be that the processor receives the MDT configuration information. Specifically, the measurement report output by the processor may be output to a transmitter, and the MDT configuration information received by the processor may come from a receiver. The transmitter and the receiver may be collectively referred to as a transceiver.

According to the foregoing aspects, MDT may be performed on a shared spectrum to obtain a measurement report. The measurement report may better reflect an application status of the shared spectrum, to help optimize a network device that performs communication by using the shared spectrum.

In the foregoing aspects, the measurement report may include a received signal strength indication (RSSI), and time information and location information that correspond to the RSSI. In this way, an operator may learn of, based on the RSSI and the time information and the location information that correspond to the RSSI, a load status of a shared spectrum at a location in a moment/time period, and learn of whether a hidden terminal that performs communication by using the shared spectrum exists at the location in the moment/time period. This helps the operator optimize a network device that is deployed at the location and that performs communication by using the shared spectrum.

In the foregoing aspects, the measurement report may include a channel occupancy (CO), and time information and location information that correspond to the channel occupancy. In this way, an operator may learn of, based on the CO and the time information and the location information that correspond to the CO, a status of interference caused by a hidden terminal to a network device that performs communication by using a shared spectrum at a location in a time period. This helps the operator optimize the network device that is deployed at the location and that performs communication by using the shared spectrum.

In the foregoing aspects, the measurement report may include listen before talk (LBT) failure information. The LBT failure information may include but is not limited to one or more of uplink LBT failure information, sidelink LBT failure information, and a quantity of times of unsuccessful preamble sending caused by an LBT failure.

In an example, the uplink LBT failure information may include an uplink LBT failure indication and time information and location information that correspond to the uplink LBT failure indication. In this way, an operator may learn of, based on the uplink LBT failure indication and the time information and the location information that correspond to the uplink LBT failure indication, an uplink LBT failure status of a terminal on a shared spectrum at a location in a time period. This helps the operator optimize a network device that is deployed at the location and that performs communication by using the shared spectrum.

In an example, the uplink LBT failure information may include an uplink LBT failure rate and time information and location information that correspond to the uplink LBT failure rate. In this way, an operator may learn of, based on the uplink LBT failure rate and the time information and the location information that correspond to the uplink LBT failure rate, an uplink LBT failure status of a terminal on a shared spectrum at a location in a time period. This helps the operator optimize a network device that is deployed at the location and that performs communication by using the shared spectrum.

In an example, similar to the uplink LBT failure information, the sidelink LBT failure information may include a sidelink LBT failure indication and/or a sidelink LBT failure rate, and time information and location information that correspond to the sidelink LBT failure indication and/or the sidelink LBT failure rate.

In the foregoing aspects, the measurement report may include signal quality information. The signal quality information indicates signal quality of a cell with best signal quality, and/or indicates signal quality of a cell of an operator that a terminal is allowed to access, and/or indicates signal quality of a cell in a cell measurement allowlist of a terminal in an RRC idle mode or an RRC inactive mode. The measurement report may further include time information and location information that correspond to signal quality of each cell. In this way, an operator may learn of, based on the signal quality information and the time information and the location information that correspond to signal quality of each cell indicated by the signal quality information that are included in the measurement report, a signal quality status of a shared spectrum. This helps the operator optimize a network device that performs communication by using the shared spectrum.

In the foregoing aspects, the measurement report may include indication information and time information and location information that correspond to the indication information. In this way, an operator may learn of, based on the indication information and the time information and the location information that correspond to the indication information, whether there is signal quality of another operator better than signal quality of a currently camped cell at a location in a time period. This helps the operator optimize a network device that is deployed at the location and that performs communication by using a shared spectrum, for example, optimize signal transmit power of the network device that performs communication by using the shared spectrum.

In the foregoing aspects, the measurement report may include operator information and time information and location information that correspond to the operator information. In this way, an operator may learn of, based on the operator information and the time information and the location information that correspond to the operator information, an operator to which a cell with best signal quality at a location in a time period belongs. This helps the operator optimize a network device that is deployed at the location and that performs communication by using a shared spectrum, for example, optimize signal transmit power of the network device that performs communication by using the shared spectrum.

In the foregoing aspects, the measurement report may include cell identification information of a currently camped cell and time information and location information that correspond to the cell identification information. In this way, an operator may learn of, based on the cell identification information of the currently camped cell and the time information and the location information that correspond to the cell identification information, a cell on which a terminal camps at a location in a time period.

In the foregoing aspects, the measurement report may include radio access type (RAT) identification information of a currently camped cell and time information and location information that correspond to the radio access type identification information. In this way, an operator may learn of, based on the RAT identification information of the currently camped cell and the time information and the location information that correspond to the RAT identification information, a RAT of a cell on which a terminal camps at a location in a time period.

In the foregoing aspects, the measurement report may further include operator identification information and frequency band identification information.

In the foregoing aspects, the MDT configuration information may include an enable indication that indicates whether to enable performing MDT on a shared spectrum.

In the foregoing aspects, the MDT measurement parameter may include but is not limited to one or more of the following information: a time indication, indicating time of performing MDT on a shared spectrum; a location indication, indicating a location at which MDT is performed on a shared spectrum; and a frequency band indication, indicating a shared spectrum or at least two subbands included in the shared spectrum.

In the foregoing aspects, the network device that sends the MDT configuration information to the terminal may be a first network device. The MDT configuration information includes identification information of the first network device. The measurement report obtained by the terminal may be sent to a second network device. The measurement report may include the identification information of the first network device. The second network device may send the measurement report that is from the terminal to the first network device based on the identification information of the first network device included in the measurement report.

DESCRIPTION OF EMBODIMENTS

Figure 1:
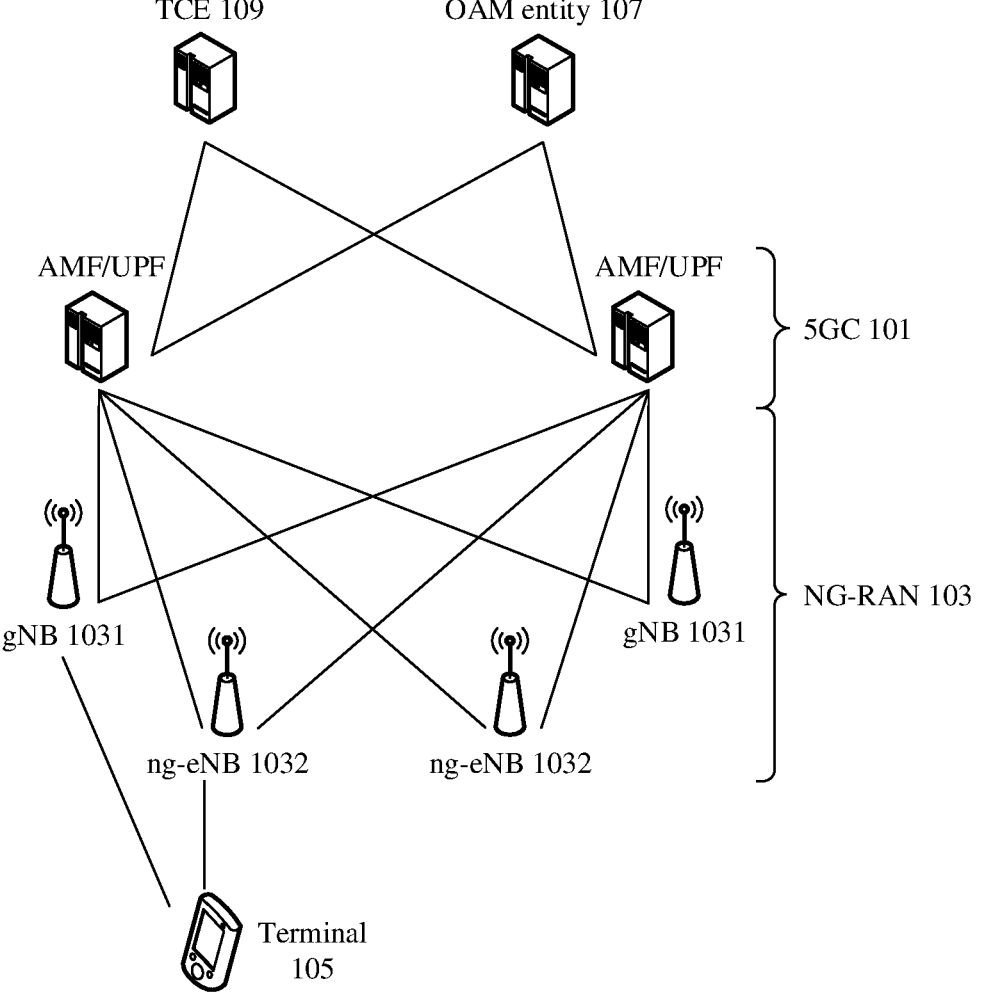
FIG. 1 is a system framework diagram of a 5G network with a non-standalone networking architecture.

FIG. 1 is a system framework diagram of a 5G network with a non-standalone networking architecture. As shown in FIG. 1, in a 5G network using a non-standalone networking architecture, a radio access network (RAN) connected to a 5G core network (5GC) 101 is also referred to as a next generation radio access network (NG-RAN) 103, and the NG-RAN 103 may include at least one 5G base station (gNodeB, gNB) 1031 and at least one evolved 4G base station (next generation evolved NodeB, ng-eNB) 1032. A terminal 105 may be connected to the NG-RAN 103 through the gNB 1031 and/or the ng-eNB 1032. The 5GC 101 is configured to manage the terminal 105 connected to the NG-RAN 103 and provide a gateway for communicating with an external network (for example, the Internet), so that the terminal 105 communicates with the external network.

In a 5G network, a gNB may provide termination points of an NR user plane and a control plane protocol, and an ng-eNB may provide termination points of an evolved universal mobile telecommunications system (UMTS) terrestrial radio access network (E-UTRAN) user plane and a control plane protocol. Connection may be established between gNBs, between the gNB and the ng-eNB, or between ng-eNBs through an Xn interface.

In the 5G network, connection may be established between the gNB and a 5GC, or between the ng-eNB and a 5GC through an NG interface. Specifically, the gNB and the ng-eNB may be connected to an access and mobility management function (AMF) entity of the 5GC through an NG-C interface, or the gNB and the ng-eNB may be connected to a user plane function (UPF) entity of the 5GC through an NG-U interface.

The gNB 1031 and the ng-eNB 1032 in the NG-RAN 103 may also be referred to as network devices. It may be understood that the network device may alternatively be another device in the NG-RAN 103, or may be another device in a radio access network of another wireless communications network. For example, the network device may alternatively be a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP). In a network architecture, the network device may include a central unit (CU) node, a distributed unit (DU) node, or a RAN device including the CU node and the DU node.

The terminal 105 is also referred to as user equipment (UE), a mobile station (MS), a mobile terminal (MT), or the like. The terminal is a device configured to provide voice/data connectivity for a user, and may be specifically a handheld device or a vehicle-mounted device that has a wireless connection function, or the like. For example, the terminal may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

In a possible implementation, the network device in the NG-RAN 103 may be connected to an operation administration and maintenance (OAM) entity 107 of an operator through the 5GC 101. The network device in the NG-RAN may receive trigger information from the OAM entity 107, and initiate management-based MDT based on the trigger information.

In this implementation, the trigger information from the OAM entity 107 may include an MDT measurement parameter. The network device may select one or more terminals from at least one terminal that has established a communication connection to the network device and/or from at least one terminal that camps on a cell managed by the network device. Then, the network device may send MDT configuration information to the terminal selected by the network device, where the MDT configuration information includes the MDT measurement parameter, to initiate management-based MDT. After the terminal performs MDT based on the MDT measurement parameter and sends a measurement report to the network device, the network device may send the measurement report to the OAM entity 107 based on operator identification information, where the operator identification information indicates an operator to which the OAM entity 107 belongs.

In a possible implementation, the network device in the NG-RAN 103 may be connected to a trace collection entity (TCE) 109 through the 5GC 101. The network device in the NG-RAN 103 may receive trigger information from the 5GC 101, and initiate signaling-based MDT based on the trigger information.

In this implementation, the trigger information from the 5GC 101 may not only include an MDT measurement parameter, but also include an identifier of a terminal that has agreed to perform MDT, and an internet protocol (IP) address of the TCE 109. The network device may send MDT configuration information to the terminal based on the identifier of the terminal that has agreed to perform MDT, where the MDT configuration information includes the MDT measurement parameter, to initiate signaling-based MDT. After the terminal performs MDT based on the MDT measurement parameter and sends a measurement report to the network device, the network device may send the measurement report to the TCE 109 based on the IP address of the TCE 109.

It should be noted that both signaling-based MDT and management-based MDT may include two types: immediate MDT and logged MDT. The immediate MDT is mainly for a terminal in an RRC connected mode. A measurement report sent by a terminal that performs immediate MDT to the network device may include one or more of the following information: a received or sent data volume, a data packet transmission delay, a packet loss rate, a data packet processing delay, and accessibility. The logged MDT is mainly for a terminal in an RRC idle mode or an RRC inactive mode. A measurement report sent by a terminal that performs logged MDT to the network device may include an RSSI of a cell on which the terminal camps and an RSSI of a neighboring cell of the cell.

In a possible implementation, for the logged MDT, the terminal in the RRC connected mode may receive MDT configuration information from the network device. After entering the RRC idle mode or the RRC inactive mode, the terminal may perform MDT based on the received MDT configuration information to obtain a measurement report. Then, when the terminal initiates an RRC connection to the network device, an RRC message sent by the terminal to the network device may include indication information. The indication information indicates that the terminal obtains the logged MDT-based measurement report. Correspondingly, the network device may request the measurement report from the terminal, and the terminal may send the measurement report obtained by the terminal to the network device.

For example, an RRC setup complete message sent by the terminal to the network device may include first indication information. The first indication information indicates that the terminal obtains the logged MDT-based measurement report. Then, a user equipment information request (UE information request) sent by the network device to the terminal may include second indication information. The second indication information indicates the terminal to send the measurement report to the network device. Correspondingly, in response to the UE information request that includes the second indication information, the terminal may send a user equipment information response (UE information response) to the network device. The UE information response includes the measurement report obtained by the terminal.

However, to extend an air interface resource of a network device and improve a data throughput of the network device, in some radio access networks, the network device may not only perform communication by using a licensed spectrum, but also perform communication by using a shared spectrum. For example, in the NG-RAN 103 in the 5G network shown in FIG. 1, the gNB 1031 or the ng-eNB 1032 is also referred to as an NR system. The NR system may not only perform communication by using a licensed spectrum, but also perform communication by using a shared spectrum. The gNB or the ng-eNB that performs communication by using the shared spectrum is also referred to as an NR-U system. In other words, a network device that performs communication by using a shared spectrum may include a gNB or an ng-eNB that performs communication by using the shared spectrum.

For a licensed spectrum, the licensed spectrum can be used only by an operator at a specific location. For a shared spectrum, all operators may use the shared spectrum according to a regulation requirement. As a result, different wireless communications devices/systems compete for the shared spectrum. Correspondingly, for a network device (for example, an NR-U system) that performs communication by using a shared spectrum, when a terminal sends uplink data to the network device, the terminal may fail to send the uplink data to the network device in time because another device performs communication by using the shared spectrum. Similarly, when the network device sends downlink data to the terminal, the network device may fail to send the downlink data to the terminal in time because another device performs communication by using the shared spectrum.

A typical regulation requirement is as follows: When a device that performs communication by using a shared spectrum sends data, a channel access process based on a listen before talk (LBT) mechanism needs to be performed. For example, when sending the uplink data to the network device by using the shared spectrum, the terminal first needs to perform channel sensing on the shared spectrum, to determine whether a channel supported by the shared spectrum is idle. If it is sensed that the channel is idle, uplink LBT of the terminal succeeds, and the terminal may send the uplink data to the network device on the channel supported by the shared spectrum. On the contrary, if it is sensed that the channel is not idle, LBT of the terminal fails, and the terminal needs to re-initiate channel sensing on the shared spectrum after corresponding backoff time. As a result, the uplink data cannot be sent to the network device in time.

A conventional MDT method is mainly for a radio access network that performs communication by using a licensed spectrum, and does not consider a case in which a network device that performs communication by using a shared spectrum exists in the radio access network. A measurement report obtained by a terminal by performing MDT may not be sufficient to reflect an application status of the shared spectrum. Correspondingly, the measurement report obtained by the terminal by performing MDT is not sufficient to support better optimization of the network device that performs communication by using the shared spectrum.

In view of this, embodiments of this disclosure provide at least one MDT method and an apparatus. MDT may be performed on a shared spectrum based on an MDT measurement parameter of the shared spectrum to obtain a measurement report. The measurement report may better reflect an application status of the shared spectrum, to facilitate better optimization of a network device that performs communication by using the shared spectrum. For example, this facilitates better optimization of a gNB or an ng-eNB that performs communication by using a shared spectrum in a 5G network, so that a terminal can send, in time, uplink data to the gNB or the ng-eNB that performs communication by using the shared spectrum.

With reference to FIG. 2 to FIG. 6, the following describes a process of exchanging information between a network device and a terminal by using an example.

Figures 2, 3A:
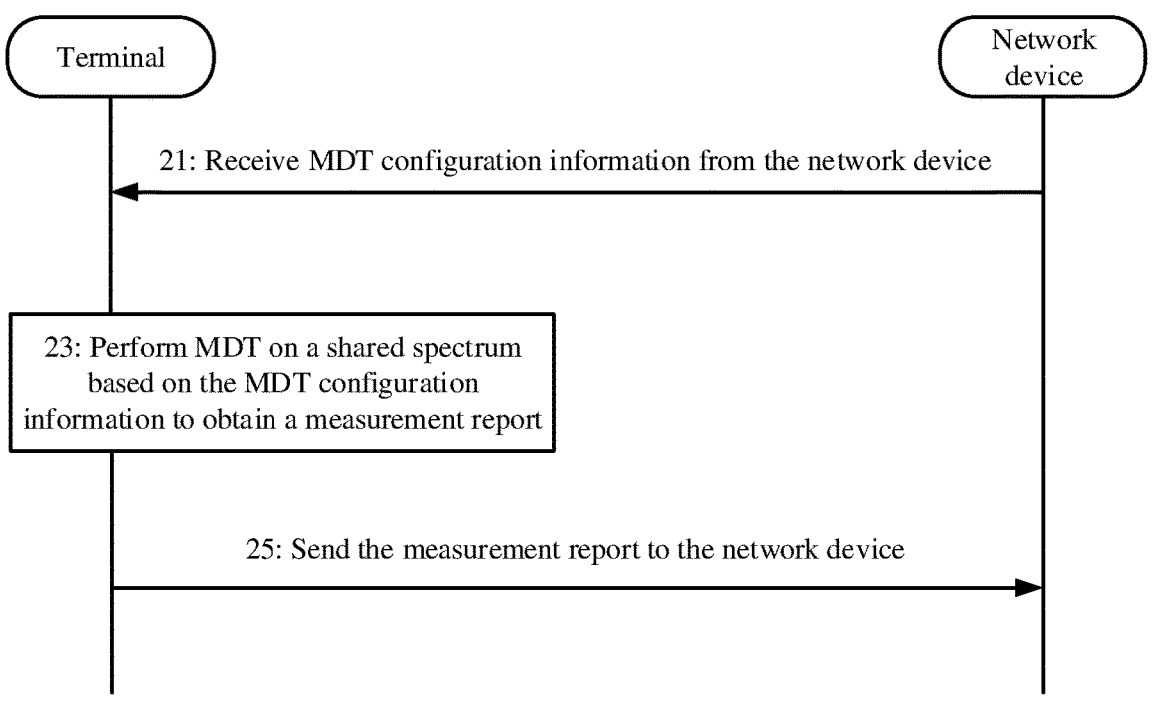
FIG. 2 is a flowchart of an MDT method according to an embodiment of this disclosure.
FIG. 3A is a first schematic diagram of MDT configuration information.

FIG. 2 is a flowchart of an MDT method according to an embodiment of this disclosure.

Step 21: A terminal receives MDT configuration information from a network device.

The MDT configuration information may include at least an MDT measurement parameter of a shared spectrum.

In a possible implementation, the MDT measurement parameter of the shared spectrum may include but is not limited to one or more of the following information: a frequency band indication, a time indication, a location indication, and at least one first enable indication.

In this implementation, the frequency band indication indicates the shared spectrum or at least two subbands included in the shared spectrum. For example, if an operator needs to know an application status of a shared spectrum f1~f3, the frequency band indication indicates the shared spectrum f1~f3, where f1 and f3 are two end values of the shared spectrum f1~f3. For example, if the operator needs to know application statuses of a subband f1~f2 and a subband f2~f3 that are included in the shared spectrum f1~f3, the frequency band indication indicates the subband f1~f2 and the subband f2~f3 that are included in the shared spectrum f1~f3, where f1 and f3 are two end values of the shared spectrum f1~f3, f2 is greater than f1, and f2 is less than f3.

In this implementation, the time indication indicates time of performing MDT on the shared spectrum by the terminal. For example, if an operator needs to know an application status of the shared spectrum in a time period t1~t2, the time indication indicates that the time of performing MDT on the shared spectrum by the terminal is the time period t1~t2, where t1 and t2 are two end values of the time period t1~t2.

In this implementation, the location indication indicates a location at which the terminal performs MDT on the shared spectrum. For example, if an operator needs to know an application status of the shared spectrum in "Pudong New Area, Shanghai", the location indication indicates that the location at which the terminal performs MDT on the shared spectrum is "Pudong New Area, Shanghai".

In this implementation, the at least one first enable indication is in a one-to-one correspondence with at least one type of information. The at least one type of information may include one or more of the following types of information of the shared spectrum: an RSSI, a CO, LBT failure information, indication information, operator information, signal quality information, RAT identification information, frequency band identification information, cell identification information, time information, and location information. The first enable indication indicates whether to enable obtaining of information corresponding to the first enable indication.

For example, as shown in FIG. 3A, the MDT measurement parameter may include:

a first enable indication X1, where X1 indicates whether to enable obtaining of the RSSI;

a first enable indication X2, where X2 indicates whether to enable obtaining of the CO;

a first enable indication X3, where X3 indicates whether to enable obtaining of the LBT failure information;

a first enable indication X4, where X4 indicates whether to enable obtaining of the indication information;

a first enable indication X5, where X5 indicates whether to enable obtaining of the operator information; and a first enable indication X6, where X6 indicates whether to enable obtaining of the signal quality information.

It may be understood that X1, X2, X3, X4, X5 and X6 are merely used to assist in describing the technical solutions provided in embodiments of this disclosure, and may be replaced with real values in an actual service scenario.

In a possible implementation, the MDT configuration information may further include a second enable indication, and the second enable indication indicates whether to enable MDT for the shared spectrum. It may be understood that the configuration information may be included in a broadcast message sent by the network device, or may be included in an RRC message or another message sent by the network device to the terminal.

It should be noted that, for any one of the at least one first enable indication and the second enable indication, if a value of the enable indication is 1, it indicates enabling, and if a value of the enable indication is 0, it indicates disabling. Alternatively, the enable indication is an enumerated-type parameter, if the enable indication is enable (or true), it indicates enabling, and if the enable indication is disable (or false), it indicates disabling. Alternatively, if the enable indication is included, it indicates enabling, and if the enable indication is not included, it indicates disabling.

In a possible implementation, if the CO of the shared spectrum needs to be obtained, the MDT measurement parameter may further include an RSSI threshold, so that the terminal determines the CO of the shared spectrum based on the RSSI threshold. It may be understood that, if an RSSI obtained by the terminal at a moment at a location is greater than the RSSI threshold, it indicates that a hidden terminal may exist at the location, and the hidden terminal performs communication at the moment by using a channel supported by the shared spectrum.

In a possible implementation, the MDT configuration information may further include the operator identification information. As described above, the network device may receive the trigger information from the OAM entity, to initiate management-based MDT. The operator identification information indicates an operator to which the OAM entity belongs, so that the measurement report from the terminal is provided to the corresponding operator in a subsequent process. For example, the measurement report from the terminal is sent to the corresponding OAM entity based on the operator identification information included in the measurement report.

In a possible implementation, the MDT configuration information may further include identification information of a network device, and the network device is a network device configured to send the MDT configuration information to the terminal. In this way, after completing performing MDT on the shared spectrum, the terminal that receives the MDT configuration information may send, based on the identification information of the network device, the measurement report obtained by the terminal to the corresponding network device.

Step 23: The terminal performs MDT on the shared spectrum based on the MDT configuration information to obtain the measurement report.

For example, the MDT measurement parameter in the MDT configuration information includes the time indication, and the time indication specifically indicates that time of performing MDT on the shared spectrum by the terminal is the time period t1~t2. In this case, the terminal may perform MDT on the shared spectrum in the time period t1~t2.

For example, the MDT measurement parameter in the configuration information includes the location indication, and the location indication specifically indicates that a location at which the terminal performs MDT on the shared spectrum is "Pudong New Area, Shanghai". In this case, the terminal may perform MDT on the shared spectrum when the terminal is located in "Pudong New Area, Shanghai".

For example, the MDT measurement parameter in the configuration information includes the frequency band indication. If the frequency band indication specifically indicates the shared spectrum f1~f3, the terminal may perform MDT on the shared spectrum f1~f3. If the frequency band indication specifically indicates the subband f1~f2 and the subband f2~f3 that are included in the shared spectrum f1~f3, the terminal may separately perform MDT on the subband f1~f2 and the subband f2~f3 that are included in the shared spectrum f1~f3.

In a possible implementation, when the MDT measurement parameter does not include the at least one first enable indication, in a process of performing MDT on the shared spectrum, the terminal may directly obtain one or more of the following information of the shared spectrum: the RSSI, the CO, the LBT failure information, the indication information, the operator information, the signal quality information, the RAT identification information, the frequency band identification information, the cell identification information, the time information, and the location information.

In a possible implementation, when the MDT measurement parameter includes the at least one first enable indication, the terminal may obtain, based on the at least one first enable indication, one or more of the following information of the shared spectrum: the RSSI, the CO, the LBT failure information, the indication information, the operator information, the signal quality information, the RAT identification information, the frequency band identification information, the cell identification information, the time information, and the location information.

Figure 3B:
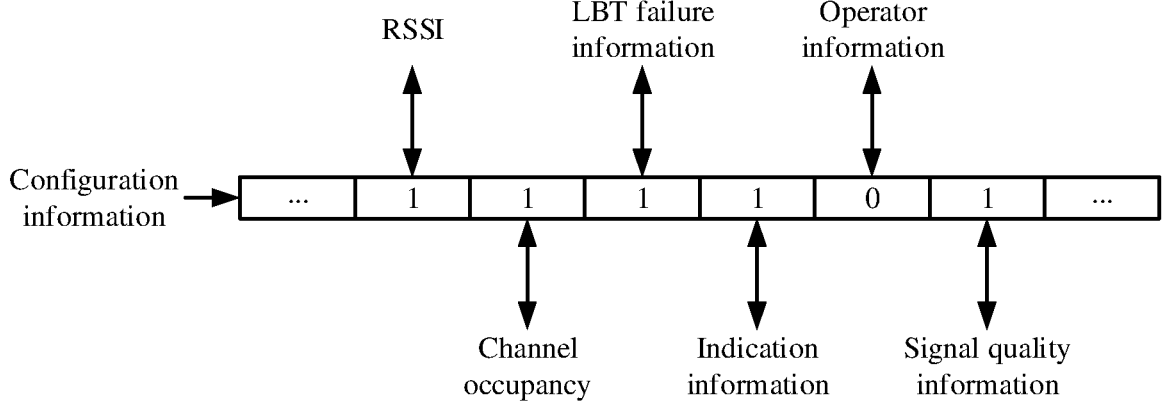
FIG. 3B is a second schematic diagram of MDT configuration information.

As shown in FIG. 3B, in the MDT measurement parameter included in the MDT configuration information, if a first enable indication corresponding to the RSSI is 1, a first enable indication corresponding to the CO is 1, a first enable indication corresponding to the LBT failure information is 1, a first enable indication corresponding to the indication information is 1, a first enable indication corresponding to the operator information is 0, and a first enable indication corresponding to the signal quality information is 1, in a process of performing MDT on the shared spectrum, the terminal may obtain the RSSI, the CO, the LBT failure information, the indication information, and the signal quality information of the shared spectrum, and the terminal does not need to obtain the operator information. In other words, the measurement report obtained by the terminal by performing MDT on the shared spectrum may include the RSSI, the CO, the LBT failure information, the indication information, and the signal quality information of the shared spectrum.

In a specific example, the terminal may measure an RSSI of the shared spectrum, and record time information and location information that correspond to the RSSI. Correspondingly, the measurement report may include the RSSI and the time information and the location information that correspond to the RSSI.

In a more specific example, the terminal may measure an RSSI of the shared spectrum for a plurality of times at different moments. Time information corresponding to an RSSI measured each time indicates a moment at which the terminal measures the RSSI, or indicates a time range to which the moment at which the terminal measures the RSSI belongs. Location information corresponding to the RSSI measured each time indicates a location at which the terminal measures the RSSI. Correspondingly, the measurement report may include one or more RSSIs of the shared spectrum, and time information and location information respectively corresponding to the one or more RSSIs.

In a more specific example, the terminal may measure an RSSI of the shared spectrum for a plurality of times at a same location at different moments in a time period, and then calculate an average value of a plurality of RSSIs measured by the terminal at the location. Correspondingly, an RSSI included in the measurement report is the average value of RSSIs measured by the terminal for a plurality of times at the location. Time information corresponding to the RSSI included in the measurement report indicates the time period to which moments at which the terminal measures the RSSI of the shared spectrum for a plurality of times belong. Location information corresponding to the RSSI included in the measurement report indicates the location at which the terminal measures the RSSI of the shared spectrum for a plurality of times.

In this way, an operator may learn of, based on the RSSI and the time information and the location information that correspond to the RSSI that are included in the measurement report, a load status of the shared spectrum at a location in a moment/time period, and learn of whether a hidden terminal that performs communication by using the shared spectrum exists at the location in the moment/time period. This helps the operator optimize a network device that is deployed at the location and that performs communication by using the shared spectrum.

For example, in the MDT measurement parameter included in the MDT configuration information, the first enable indication corresponding to the RSSI is 1, the time indication specifically indicates that time of performing MDT on the shared spectrum by the terminal is the time period t1~t2, and the location indication specifically indicates that a location at which the terminal performs MDT on the shared spectrum is Pudong New Area, Shanghai. In this case, when the terminal is located in Pudong New Area, Shanghai, for example, located on Century Avenue in Pudong New Area, Shanghai, the terminal may start to measure the RSSI of the shared spectrum from a moment t1. It is assumed that the terminal is always located on Century Avenue in the time period t1~t2, an RSSI of the shared spectrum measured at the moment t1 is RSSI_t1, an RSSI of the shared spectrum measured at a moment t11 after the moment t1 is RSSI_t11, an RSSI of the shared spectrum measured at a moment t12 after the moment t11 is RSSI_t12, and an RSSI of the shared spectrum measured at a moment t2 after the moment t12 is RSSI_t2. In this case, the terminal may record information shown in the following Table 1, and the measurement report may include the information shown in the following Table 1.

TABLE 1

| RSSI | Time information | Location information |
|---|---|---|
| RSSI_t1 | t1 | Century Avenue, Shanghai |
| RSSI_t11 | t11 | Century Avenue, Shanghai |
| RSSI_t12 | t12 | Century Avenue, Shanghai |
| RSSI_t2 | t2 | Century Avenue, Shanghai |

The time information respectively corresponding to the RSSI_t1, the RSSI_t11, the RSSI_t12 and the RSSI_t2 may alternatively be the time range "t1~t2" to which t1, t11, t12, and t2 belong. Table 1 is merely used to assist in describing the technical solutions provided in embodiments of this disclosure. In an actual application scenario, field values of the RSSI field, the time information field, and the location information field shown in Table 1 may be replaced with real values.

Correspondingly, the terminal may further calculate an average value of the RSSI_t1, the RSSI_t11, the RSSI_t12, and the RSSI_t2 that are measured by the terminal in the time period t1~t2. The RSSI included in the measurement report is the average value of the RSSI_t1, the RSSI_t11, the RSSI_t12, and the RSSI_t2. The time information corresponding to the RSSI included in the measurement report indicates the time period "t1~t2". The location information corresponding to the RSSI included in the measurement report indicates the location "Century Avenue, Shanghai". In a specific example, the terminal may measure a CO of the shared spectrum, and record time information and location information that correspond to the CO. Correspondingly, the measurement report may include the CO measured by the terminal and the time information and the location information that correspond to the CO.

For example, if the terminal is located on Century Avenue, Shanghai in the time period t1~t2, a quantity of RSSIs of the shared spectrum that are measured by the terminal in the time period t1~42 is N, and a quantity of RSSIs greater than the RSSI threshold is M, the CO of the shared spectrum in the time period t1~42 is a ratio M/N of M to N. Correspondingly, the time information corresponding to the CO indicates the time period "t1~42" to which a moment at which the terminal measures each RSSI for determining the CO belongs. The location information corresponding to the CO indicates the location "Century Avenue, Shanghai" at which the terminal measures each RSSI for determining the CO. In this way, an operator may learn of, based on the CO and the time information and the location information that correspond to the CO that are included in the measurement report, a status of interference caused by a hidden terminal to a network device that performs communication by using the shared spectrum at a location in a time period. This helps the operator optimize the network device that is deployed at the location and that performs communication by using the shared spectrum.

In a specific example, the terminal may obtain the LBT failure information of the terminal on the shared spectrum. Correspondingly, the measurement report may include the LBT failure information. The LBT failure information may include one or more of the following types of information: uplink LBT failure information, sidelink LBT failure information, and a quantity of times of unsuccessful preamble sending caused by an LBT failure.

It should be noted that, when the terminal has uplink data to be sent to the network device, the terminal may perform channel sensing on the shared spectrum. When it is sensed that the shared spectrum is not in an idle mode, an uplink LBT failure occurs on the terminal. On the contrary, when it is sensed that the shared spectrum is in an idle mode, the terminal succeeds in performing uplink LBT. When the terminal has sidelink data that needs to be sent to another terminal via a near field communication module (for example, a Bluetooth module) disposed on the terminal, the terminal may perform channel sensing on the shared spectrum. When it is sensed that the shared spectrum is not in an idle mode, a sidelink LBT failure occurs on the terminal. On the contrary, when it is sensed that the shared spectrum is in an idle mode, the terminal succeeds in performing sidelink LBT. When the terminal needs to initiate a random access process, to be specific, when the terminal needs to send a random access preamble to the network device, the terminal may perform channel sensing on the shared spectrum. When it is sensed that the shared spectrum is not in an idle mode, an LBT failure occurs on the terminal, and the terminal cannot successfully send the preamble. The terminal needs to re-initiate channel sensing on the shared spectrum after corresponding backoff time, and can successfully send the preamble only when it is sensed that the shared spectrum is in an idle mode.

In a more specific example, the uplink LBT failure information includes an uplink LBT failure indication, and the uplink LBT failure indication indicates that an uplink LBT failure occurs on the terminal.

In some embodiments, when an uplink LBT failure occurs on the terminal, an uplink LBT failure indication indicating that the uplink LBT failure occurs on the terminal may be recorded, and time information and location information that correspond to the uplink LBT failure indication may be recorded. Correspondingly, one or more uplink LBT failures may occur on the terminal in a time period, and the terminal may record one or more uplink LBT failure indications. The measurement report may include the one or more uplink LBT failure indications, and include time information and location information respectively corresponding to the one or more uplink LBT failure indications. In this case, time information corresponding to one uplink LBT failure indication indicates a moment at which one of the uplink LBT failures occurs on the terminal, or indicates a time range to which the moment at which the uplink LBT failure occurs on the terminal belongs. Location information corresponding to the uplink LBT failure indication indicates a location at which the terminal is located when the uplink LBT failure occurs. In this way, an operator may learn of, based on the one or more uplink LBT failure indications and the time information and the location information respectively corresponding to the one or more uplink LBT failure indications that are included in the measurement report, an uplink LBT failure status of the terminal at a location on the shared spectrum in a time period. This helps the operator optimize a network device that is deployed at the location and that performs communication by using the shared spectrum.

For example, in the MDT measurement parameter included in the MDT configuration information, a first enable indication corresponding to the LBT failure information is 1, the time indication specifically indicates that the time of performing MDT on the shared spectrum by the terminal is the time period t1~t2, and the location indication specifically indicates that the location at which the terminal performs MDT on the shared spectrum is "Pudong New Area, Shanghai". In this case, when the terminal is located in Pudong New Area, Shanghai, for example, located on Century Avenue, Shanghai, the terminal may start to record the LBT failure information of the terminal on the shared spectrum from a moment t1, for example, record the uplink LBT failure information of the terminal on the shared spectrum. It is assumed that the terminal is always located on Century Avenue, Shanghai in the time period t1~t2, an uplink LBT failure occurs on the terminal at a moment t21 after the moment t1, and the uplink LBT failure occurs again at a moment t22 after the moment t21. In this case, the terminal may record information shown in the following Table 2, and the measurement report obtained by the terminal may include the information shown in the following Table 2.

TABLE 2

| Uplink LBT failure indication | Time information | Location information |
| --- | --- | --- |
| UL LBT failure | T21 | Century Avenue, Shanghai |
| UL LBT failure | T22 | Century Avenue, Shanghai |

It may be understood that Table 2 is merely used to assist in describing the technical solutions provided in embodiments of this disclosure. In an actual application scenario, field values of the uplink LBT failure indication field, the time information field, and the location information field shown in Table 2 may be replaced with real values. In some embodiments, a plurality of consistent uplink LBT failures may occur on the terminal in a time period, and the terminal may record time information and location information that correspond to each uplink LBT failure that occurs on the terminal. Time information corresponding to one uplink LBT failure that occurs on the terminal indicates a moment at which the uplink LBT failure occurs on the terminal. Location information corresponding to one uplink LBT failure that occurs on the terminal indicates a location at which the uplink LBT failure occurs on the terminal. Correspondingly, the measurement report may include one uplink LBT failure indication indicating that the consistent uplink LBT failures occur on the terminal, and include the time information and the location information that correspond to each uplink LBT failure that occurs on the terminal.

In a more specific example, the uplink LBT failure information may include an uplink LBT failure rate. In some embodiments, the terminal may obtain an uplink LBT failure rate of the terminal in a time period, and record time information and location information that correspond to the uplink LBT failure rate. Correspondingly, the measurement report may include the uplink LBT failure rate, and the time information and the location information that correspond to the uplink LBT failure rate.

For example, if a quantity of uplink LBT failures that occur on the terminal in the time period t1~t2 on Century Avenue, Shanghai is A1, and a quantity of uplink LBT successes is A2, to be specific, a quantity of uplink LBTs performed by the terminal in the time period t1~t2 is (A1+A2), the uplink LBT failure rate of the terminal in the time period t1~t2 is a ratio of A1 to (A1+B1). Correspondingly, the time information corresponding to the uplink LBT failure rate indicates the time period "t1~t2". The location information corresponding to the uplink LBT failure rate indicates the location "Century Avenue, Shanghai" of the terminal in the time period "t1~t2".

It should be noted that the uplink LBT failure information may also include other information that can indicate the uplink LBT failure status of the terminal. For example, the uplink LBT failure information may include an uplink LBT success rate of the terminal at a location in a time period, or include any one or more of a quantity of uplink LBT failures, a quantity of uplink LBT successes, and a quantity of uplink LBTs performed by the terminal at a location in a time period.

It may be understood that the sidelink LBT failure information is similar to the uplink LBT failure information. For example, the sidelink LBT failure information may include a sidelink LBT failure indication and time information and location information that correspond to the sidelink LBT failure indication, and a sidelink LBT failure rate and time information and location information that correspond to the sidelink LBT failure rate. Therefore, for the sidelink LBT failure information, refer to the foregoing descriptions of the uplink LBT failure information. The sidelink LBT failure information and other information related to the sidelink LBT failure information is not described herein.

In a specific example, the terminal may measure signal quality of each cell that performs communication by using the shared spectrum, and determine, based on the signal quality of each cell, a cell with best signal quality. The cell that performs communication by using the shared spectrum is a cell managed by a network device that performs communication by using the shared spectrum. The cell that performs communication by using the shared spectrum may be a cell of an operator that the terminal is allowed to access, or may be a cell in a cell measurement allowlist of a terminal in an RRC idle mode or an RRC inactive mode. Correspondingly, the measurement report may include signal quality information. The signal quality information indicates signal quality of the cell with best signal quality, and/or indicates signal quality of the cell of the operator that the terminal is allowed to access, and/or indicates signal quality of the cell in the cell measurement allowlist of the terminal in the RRC idle mode or the RRC inactive mode.

In some embodiments, the terminal may further record time information and location information that correspond to signal quality of each cell measured by the terminal. Correspondingly, the measurement report may include the time information and the location information that correspond to signal quality of each cell. In this way, an operator may learn of, based on the signal quality information and the time information and the location information that correspond to signal quality of each cell indicated by the signal quality information that are included in the measurement report, a signal quality status of the shared spectrum. This helps the operator optimize a network device that performs communication by using the shared spectrum.

For example, the terminal is located on Century Avenue, Shanghai at a moment t12 in the time period t1~t2, and measures, at the moment t12, signal quality of a cell of an operator that the terminal is allowed to access. In this case, time information corresponding to the signal quality of the cell indicates the moment t12 at which the terminal measures the signal quality of the cell, or indicates the time period t1~t2 to which the moment t12 belongs. Location information corresponding to the signal quality of the cell indicates the location "Century Avenue, Shanghai" at which the terminal measures the signal quality of the cell.

The signal quality information of the cell may be reference signal received power (RSRP) or reference signal received quality (RSRQ) of the cell.

In a specific example, the terminal may further determine a cell with best signal quality, and further obtain operator information and time information and location information that correspond to the operator information. The operator information indicates an operator to which the cell with best signal quality belongs. Correspondingly, the measurement report may include the operator information and the time information and the location information that correspond to the operator information. In this way, an operator may learn of, based on the operator information and the time information and the location information that correspond to the operator information, an operator to which a cell with best signal quality at a location in a time period belongs. This helps the operator optimize a network device that is deployed at the location and that performs communication by using the shared spectrum, for example, optimize signal transmit power of the network device that performs communication by using the shared spectrum.

For example, the terminal is always located on Century Avenue, Shanghai in the time period t1~t2, and the operator to which the cell with best signal quality measured by the terminal in the time period t1~t2 belongs is "China Mobile". In this case, the measurement report may include operator information indicating the operator "China Mobile", time information corresponding to the operator information indicates the time period "t1~t2", and location information corresponding to the operator information indicates the location "Century Avenue, Shanghai" of the terminal in the time period t1~t2.

In a specific example, the terminal may further obtain indication information and time information and location information that correspond to the indication information. The indication information indicates whether there is signal quality of another operator better than signal quality of a currently camped cell. The currently camped cell belongs to the operator indicated by the operator identification information in the MDT configuration information. A network device configured to manage the currently camped cell communicates with the terminal by using the shared spectrum. Correspondingly, the measurement report may include the indication information and the time information and the location information that correspond to the indication information. In this way, an operator may learn of, based on the indication information and the time information and the location information that correspond to the indication that are included in the measurement report, whether there is signal quality of another operator better than signal quality of a currently camped cell at a location in a time period. This helps the operator optimize a network device that is deployed at the location and that performs communication by using the shared spectrum, for example, optimize signal transmit power of the network device that performs communication by using the shared spectrum.

For example, the operator indicated by the operator identification information in the MDT configuration information is "China Telecom". The terminal is located on Century Avenue, Shanghai in the time period t1~t2, camps on a cell of "China Telecom", measures signal quality of the cell, and further measures signal quality of a neighboring cell of the cell. The neighboring cell may be a cell of another operator (for example, China Mobile). The terminal may generate indication information based on signal quality of each cell measured by the terminal in the time period t1~t2. Time information corresponding to the indication information indicates the time period "t1~t2". Location information corresponding to the indication information indicates the location "Century Avenue, Shanghai" of the terminal in the time period t1~t2.

In a specific example, the terminal may further obtain cell identification information of a currently camped cell and time information and location information that correspond to the cell identification information. Correspondingly, the measurement report may include the cell identification information of the currently camped cell and the time information and the location information that correspond to the cell identification information. In this way, an operator may learn of, based on the cell identification information and the time information and the location information that correspond to the cell identification information that are included in the measurement report, a cell on which the terminal camps at a location in a time period.

For example, the terminal is always located on Century Avenue, Shanghai in the time period t1~t2, and camps on one cell of China Telecom. A network device configured to manage the cell communicates with the terminal by using the shared spectrum. The terminal may obtain cell identification information of the cell. Time information corresponding to the cell identification information indicates the time period "t1~t2". Location information corresponding to the cell identification information indicates the location "Century Avenue, Shanghai" of the terminal in the time period "t1~t2".

In a specific example, the terminal may obtain RAT identification information of a currently camped cell and time information and location information that correspond to the RAT identification information. Correspondingly, the measurement report may include the RAT identification information of the currently camped cell and the time information and the location information that correspond to the RAT identification information. In this way, an operator may learn of, based on the RAT identification information and the time information and the location information that correspond to the RAT identification information that are included in the measurement report, a RAT of a cell on which the terminal camps at a location in a time period.

For example, the terminal is always located on Century Avenue, Shanghai in the time period t1~t2, and camps on one cell of China Telecom. A RAT used by a network device configured to manage the cell may be LTE, WLAN, or NR. The terminal may obtain RAT identification information of the cell. The RAT identification information indicates the RAT used by the network device configured to manage the cell. Time information corresponding to the RAT identification information indicates the time period "t1~t2". Location information corresponding to the cell identification information indicates the location "Century Avenue, Shanghai" of the terminal in the time period "t1~t2".

It should be noted that, when the MDT measurement parameter includes the frequency band indication, and the frequency band indication specifically indicates a plurality of subbands included in the shared spectrum, in a process of performing MDT on the shared spectrum, the terminal needs to perform MDT on each subband included in the shared spectrum. Correspondingly, the measurement report obtained by the terminal may include one or more of information such as an RSSI, a CO, LBT failure information, indication information, and signal quality information of each subband.

Correspondingly, in a possible implementation, the measurement report may further include information about at least two frequency bands, and the information about the at least two frequency bands is in a one-to-one correspondence with the at least two subbands included in the shared spectrum. Frequency band information indicates subbands to which information such as an RSSI, a CO, LBT failure information, indication information, and signal quality information included in the measurement report belong.

Step 25: The terminal sends the measurement report to the network device.

As described above, the terminal has mobility. After receiving MDT configuration information from one network device, and performing MDT on a shared spectrum based on an MDT measurement parameter included in the configuration information to obtain a measurement report, the terminal may send the measurement report to another network device to which the terminal has established a communication connection. Correspondingly, to ensure that the measurement report obtained by the terminal may be sent to the network device configured to send the MDT configuration information to the terminal, the measurement report may include identification information of the network device configured to send the MDT configuration information to the terminal. In this way, for the another network device that establishes the communication connection to the terminal, after receiving the measurement report from the terminal, the network device may send, based on the network device identification information included in the measurement report, the measurement report to the network device configured to send the MDT configuration information to the terminal.

Figure 4:
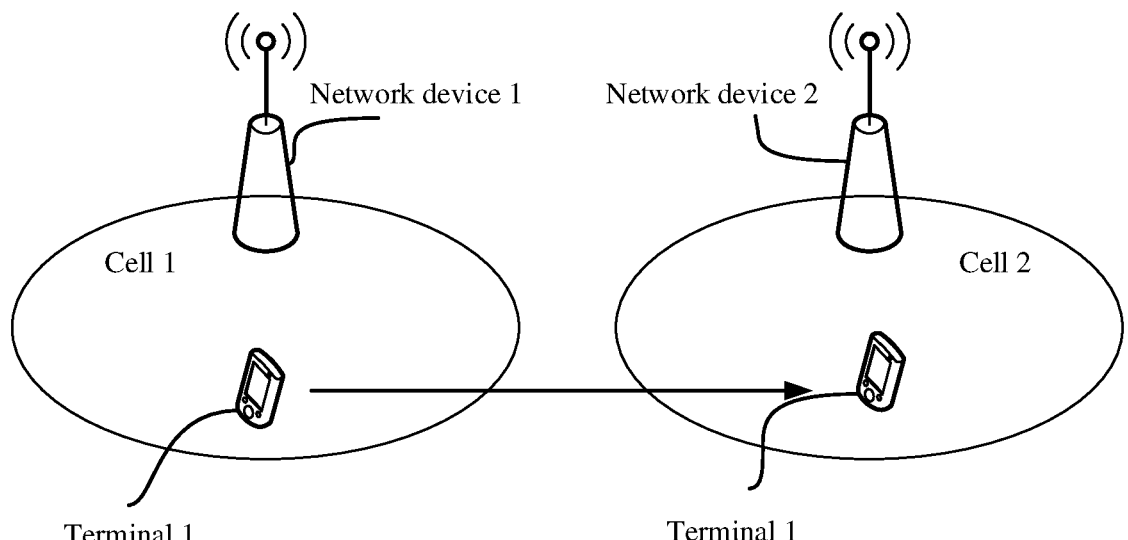
FIG. 4 is a schematic diagram of an application scenario according to an embodiment of this disclosure.

As shown in FIG. 4, before a moment t1, a terminal 1 may be located in a cell 1 managed by a network device 1, and the terminal 1 may receive MDT configuration information from the network device 1. That is, the network device 1 is a network device configured to send the MDT configuration information to the terminal 1. Then, the terminal 1 may perform MDT on a shared spectrum in a time period t1~t2 to obtain a measurement report. At a moment t2 or after the moment t2, the terminal 1 may not be located in the cell 1 managed by the network device 1, but may be located in a cell 2 managed by a network device 2. The terminal may establish a communication connection to the network device 2 configured to manage the cell 2, and send the measurement report obtained by the terminal to the network device 2. Then, the network device 2 may send the measurement report to the network device 1 based on identification information of the network device 1 included in the measurement report.

In some embodiments, the network device may alternatively send the measurement report to a TCE based on an IP address of the TCE included in the trigger information received by the network device, or send the measurement report, based on the operator identification information included in the measurement report, to an OAM entity of an operator indicated by the operator identification information. In this way, the measurement report obtained by the terminal may be provided to a corresponding operator, so that the operator optimizes, based on information included in the measurement report, a network device that performs communication by using the shared spectrum.

Figure 5:
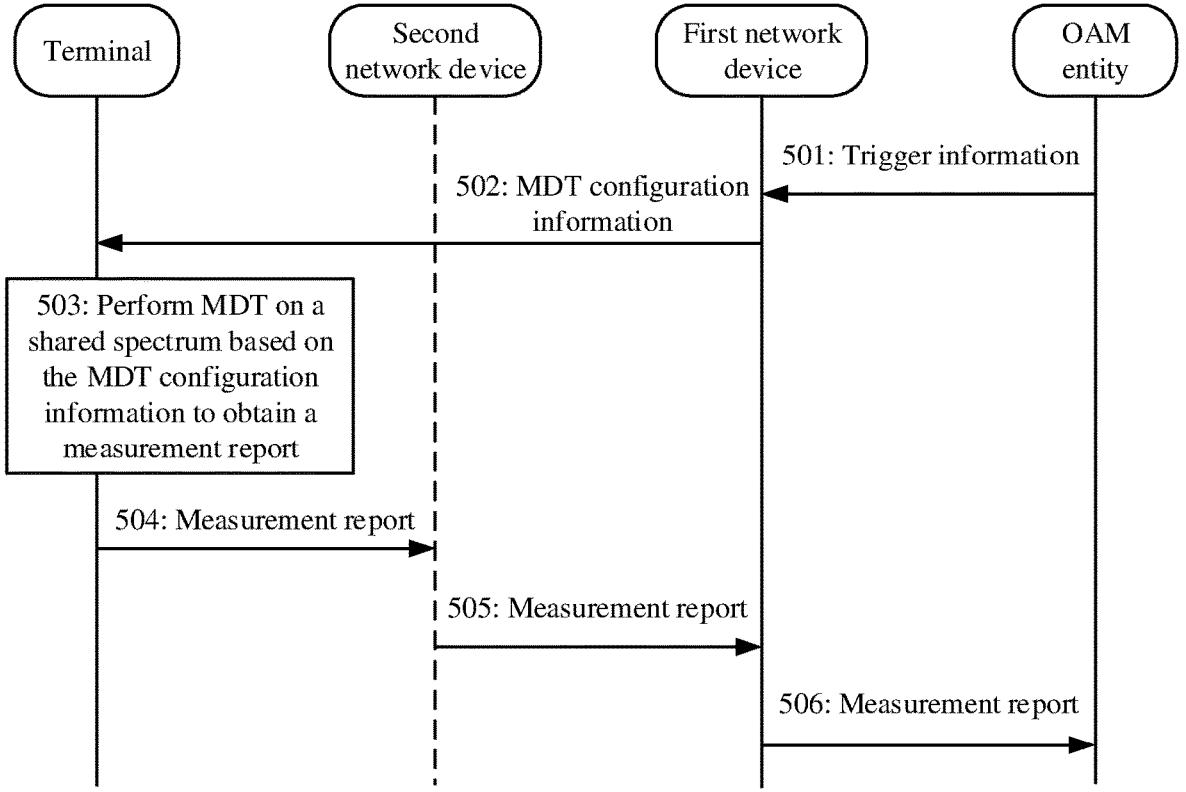
FIG. 5 is a flowchart of another MDT method according to an embodiment of this disclosure.

FIG. 5 is a flowchart of another MDT method according to an embodiment of this disclosure. In the method shown in FIG. 5, an example in which a network device receives trigger information from an OAM entity and initiates management-based MDT is mainly used to describe the technical solutions provided in embodiments of this disclosure.

Step 501: A first network device receives trigger information from an OAM entity.

The trigger information may include an MDT measurement parameter of a shared spectrum and operator identification information. The operator identification information indicates an operator to which the OAM entity belongs.

For ease of description, an example in which the MDT measurement parameter includes a time indication, a location indication, and a frequency band indication, the time indication specifically indicates that time of performing MDT on the shared spectrum by a terminal is a time period t1~t2, the location indication specifically indicates that a location at which the terminal performs MDT on the shared spectrum is Pudong New Area, Shanghai, and the frequency band indication specifically indicates a subband f1~f2 and a subband f2~f3 that are included in a shared spectrum f1~f3 is used to describe the technical solutions provided in embodiments of this disclosure.

Step 502: The terminal receives MDT configuration information from the first network device.

As described above, the terminal may be a terminal camping on a cell managed by the first network device, or may be a terminal that has established a communication connection to the first network device.

As described above, the MDT configuration information may include the operator identification information, the MDT measurement parameter of the shared spectrum, and identification information of the first network device.

Step 503: The terminal performs MDT on the shared spectrum based on the MDT configuration information to obtain a measurement report.

The terminal may separately perform MDT on the subband f1~f2 and the subband f2~f3 in the time period t1~42. Correspondingly, the measurement report may include MDT measurement results of the subband f1~f2 and the subband f2~f3.

It may be understood that, when the frequency band indication specifically indicates at least two subbands included in the shared spectrum, the measurement report may include respective MDT measurement results of the at least two subbands.

Figure 6:
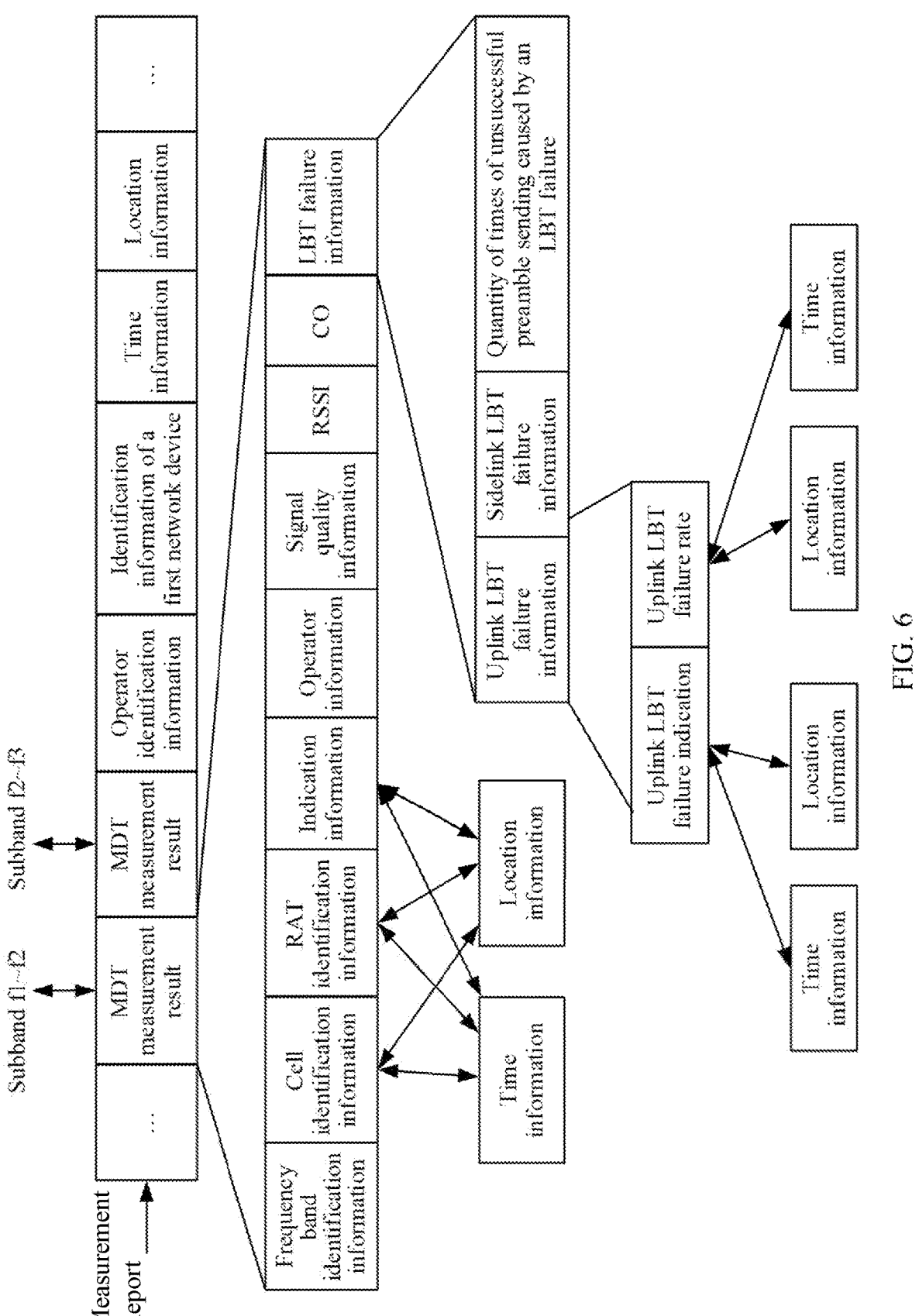
FIG. 6 is a schematic diagram of an MDT measurement report.

As shown in FIG. 6, the measurement report obtained by the terminal may include an MDT measurement result of the subband f1~f2, an MDT measurement result of the subband f2~f3, the operator identification information, and the identification information of the first network device. In some embodiments, the measurement report may further include time information and location information. The time information indicates the time period "t1~t2" in which the terminal performs MDT on the subband f1~f2 and the subband f2~f3 that are included in the shared spectrum f1~f3. The location information indicates the location "Pudong New Area, Shanghai" at which the terminal performs MDT on the shared spectrum.

The MDT measurement result may include one or more of frequency band identification information, cell identification information, RAT identification information, the operator identification information, indication information, signal quality information, an RSSI, a CO, and LBT failure information.

The MDT measurement result may include the frequency band identification information, where the frequency band identification information indicates a subband to which the MDT measurement result belongs. For example, the MDT measurement result of the subband f1~f2 may include frequency band identification information indicating the subband f1~f2.

The MDT measurement result may include one or more pieces of cell identification information, one or more pieces of RAT identification information, and one or more pieces of indication information. For example, an operator initiating MDT is "China Mobile", in other words, an operator indicated by the operator identification information is "China Mobile". "China Mobile" may deploy a plurality of network devices in Pudong New Area, Shanghai, and each network device may manage one or more cells. Because the terminal has mobility, the terminal may camp on different cells of "China Mobile" at different moments in the time period t1~t2. It is assumed that the terminal sequentially camps on at least two cells of "China Mobile" in the time period t1~t2. In this case, the MDT measurement result may include: respective cell identification information of the at least two cells on which the terminal camps, respective RAT identification information of the at least two cells on which the terminal camps, and at least two pieces of indication information. In some embodiments, the MDT measurement result may further include time information and location information that correspond to the respective cell identification information of the at least two cells on which the terminal camps/the respective RAT identification information of the at least two cells/the at least two pieces of indication information.

The MDT measurement result may include one or more pieces of operator information. In some embodiments, the MDT measurement result may further include time information and location information respectively corresponding to the one or more pieces of operator information. For example, for the subband f1~f2, in a time period t1~t12, the terminal is located on Century Avenue, Shanghai, and an operator to which a cell with best signal quality belongs is "China Mobile". In this case, the MDT measurement result of the subband f1~f2 may include operator information indicating the operator "China Mobile". Time information corresponding to the operator information indicates the time period "t1~t12". Location information corresponding to the operator information indicates the location "Century Avenue, Shanghai" of the terminal in the time period t1~t12. For example, for the subband f1~f2, in a time period t12~t2, the terminal is located on Century Avenue, Shanghai, and an operator to which a cell with the best signal quality belongs is "China Telecom". In this case, the MDT measurement result of the subband f1~f2 may include operator information indicating the operator "China Telecom". Time information corresponding to the operator information indicates the time period "t12~t2". Location information corresponding to the operator information indicates the location "Century Avenue, Shanghai" of the terminal in the time period t12~t2.

The MDT measurement result may include the signal quality information.

The MDT measurement result may include one or more RSSIs. In some embodiments, time information and location information respectively corresponding to the one or more RSSIs may be further included.

The MDT measurement result may include one or more COs. In some embodiments, time information and location information respectively corresponding to the one or more COs may be further included.

The MDT measurement result may include the LBT failure information. The LBT failure information may include one or more of the following information: uplink LBT failure information, sidelink LBT failure information, and a quantity of times of unsuccessful preamble sending caused by an LBT failure.

In some embodiments, the uplink LBT failure information may include one or more uplink LBT failure indications, and may further include time information and location information respectively corresponding to the one or more uplink LBT failure indications.

In some embodiments, the uplink LBT failure information may include one or more uplink LBT failure rates, and may further include time information and location information respectively corresponding to the one or more uplink LBT failure rates.

It should be noted that, for the sidelink LBT failure information, refer to the foregoing descriptions of the uplink LBT failure information, and details are not described herein again.

Step 504: The terminal sends the measurement report to a second network device.

When the terminal camps on a cell managed by the second network device, an RRC setup complete message sent by the terminal to the second network device may include first indication information. The first indication information indicates that the terminal records the measurement report obtained by performing MDT on the shared spectrum by the terminal. Then, a UE information request sent by the second network device to the terminal may include second indication information. The second indication information indicates the terminal to send the measurement report to the second network device. Correspondingly, in response to the UE information request that includes the second indication information, the terminal may send a UE information response to the second network device. The UE information response includes the measurement report recorded by the terminal.

Step 505: The second network device sends the measurement report to the first network device based on the identification information of the first network device included in the measurement report.

The identification information of the first network device may include but is not limited to a media access control (MAC) address of the first network device.

Step 506: The first network device sends the measurement report to the OAM entity based on the operator identification information included in the measurement report. The operator to which the OAM entity belongs is an operator indicated by the operator identification information.

It should be noted that, after receiving the MDT configuration information from the first network device, and performing MDT on the shared spectrum based on the MDT configuration information to obtain the measurement report, the terminal still maintains the communication connection to the first network device. In this case, the terminal may directly send the measurement report to the first network device that maintains the communication connection to the terminal.

Based on a same concept as the foregoing method embodiments, embodiments of this disclosure further provide a communication apparatus configured to implement any one of the foregoing methods. For example, a communication apparatus 700 is provided, and includes units (or means) configured to implement the steps performed by the terminal in any one of the foregoing methods. For another example, another communication apparatus is further provided, and includes units (or means) configured to implement the steps performed by the network device in any one of the foregoing methods.

Figure 7:
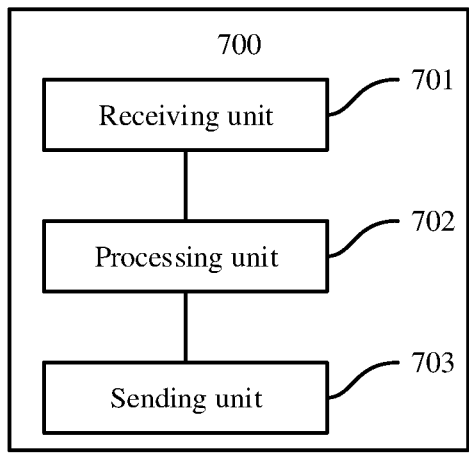
FIG. 7 is a schematic diagram of a structure of a communication apparatus according to an embodiment of this disclosure.

As shown in FIG. 7, the communication apparatus 700 may include a receiving unit 701, a processing unit 702, and a sending unit 703. The receiving unit 701 is configured to receive MDT configuration information from a network device. The MDT configuration information includes an MDT measurement parameter of a shared spectrum. The processing unit 702 is configured to perform MDT on the shared spectrum based on the MDT configuration information to obtain a measurement report. The sending unit 703 is configured to send the measurement report to the network device.

It should be understood that division into the units in the communication apparatus is merely logical function division. In an actual implementation, all or some of the units may be integrated into one physical entity, or may be physically separated. In addition, all the units in the communication apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the communication apparatus to perform a function of the unit. In addition, all or some of the units may be integrated together, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, any one of the foregoing units in the communication apparatus may be one or more integrated circuits configured to implement the foregoing methods, for example, one or more application-specific integrated circuits (ASICs), one or more microprocessors (DSPs), one or more field programmable gate arrays (FPGAs), or a combination of at least two of these integrated circuit forms. For another example, when the units in the apparatus may be implemented in a form of a program invoked by a processing element, the processing element may be a general-purpose processor, for example, a central processing unit (CPU) or another processor that can invoke the program. For still another example, the units may be integrated and implemented in a form of a system-on-a-chip (SOC).

The foregoing unit for receiving is an interface circuit of the communication apparatus, and is configured to receive a signal from another apparatus. For example, when the communication apparatus is implemented by a chip, the receiving unit is an interface circuit that is of the chip and that is configured to receive a signal from another chip or apparatus. The foregoing unit for sending is an interface circuit of the communication apparatus, and is configured to send a signal to another apparatus. For example, when the communication apparatus is implemented by a chip, the sending unit is an interface circuit that is of the chip and that is configured to send a signal to another chip or apparatus.

Figure 8:
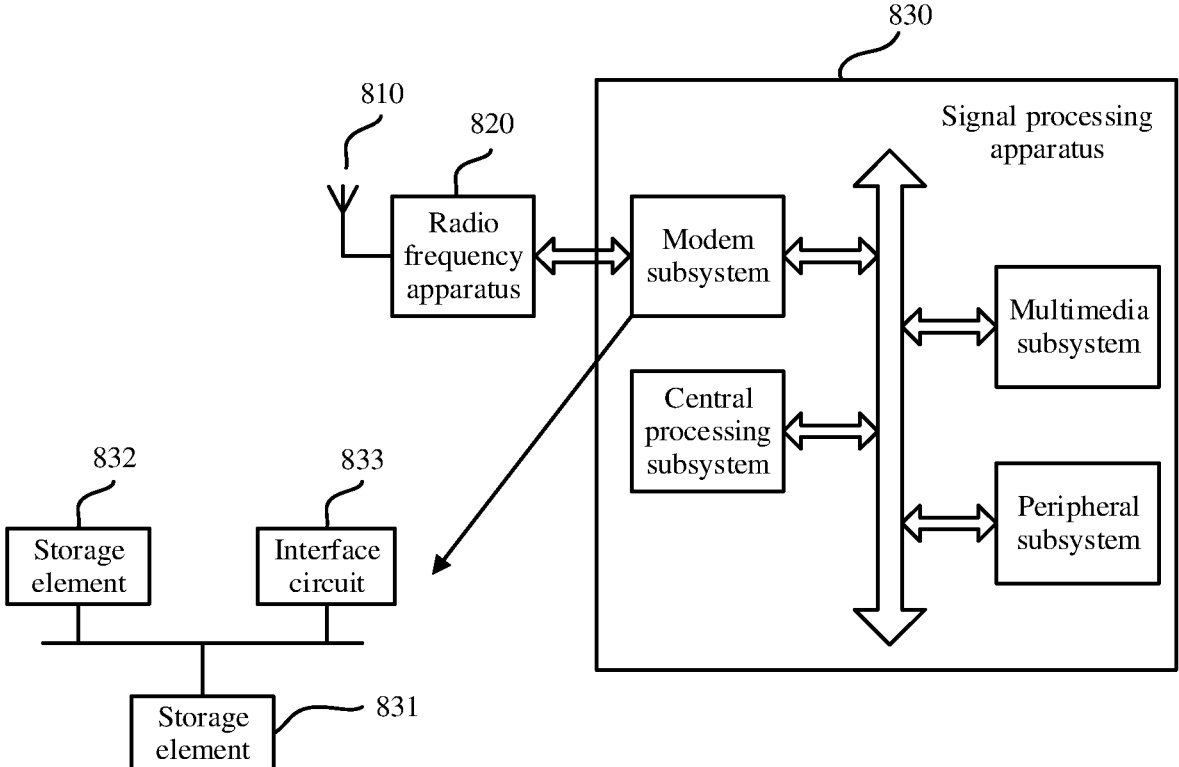
FIG. 8 is a schematic diagram of a structure of a terminal according to an embodiment of this disclosure.

FIG. 8 is a schematic diagram of a structure of a terminal according to an embodiment of this disclosure. The terminal may be the terminal in the foregoing embodiments, and is configured to implement operations of the terminal in the foregoing embodiments. As shown in FIG. 8, the terminal includes an antenna 810, a radio frequency apparatus 820, and a signal processing apparatus 830. The antenna 810 is connected to the radio frequency apparatus 820. In a downlink direction, the radio frequency apparatus 820 receives, through the antenna 810, information sent by a network device, and sends, to the signal processing apparatus 830 for processing, the information sent by the network device. In an uplink direction, the signal processing apparatus 830 processes information about the terminal, and sends the processed information to the radio frequency apparatus 820. The radio frequency apparatus 820 processes the information about the terminal, and then sends the processed information to the network device through the antenna 810.

The signal processing apparatus 830 may include a modem subsystem, configured to process data at each communication protocol layer. The signal processing apparatus 830 may further include a central processing subsystem, configured to process an operating system and an application layer of the terminal. In addition, the signal processing apparatus 830 may further include another subsystem, for example, a multimedia subsystem, or a peripheral subsystem. The multimedia subsystem is configured to control a camera, a screen display, or the like of the terminal. The peripheral subsystem is configured to implement a connection to another device. The modem subsystem may be a chip that is separately disposed.

The modem subsystem may include one or more processing elements 831, for example, include a main control CPU and another integrated circuit. In addition, the modem subsystem may further include a storage element 832 and an interface circuit 833. The storage element 832 is configured to store data and a program. However, the program used to perform the methods performed by the terminal in the foregoing methods may not be stored in the storage element 832, but is stored in a memory outside the modem subsystem, and is loaded and used by the modem subsystem when to be used. The interface circuit 833 is configured to communicate with another subsystem. The foregoing communication apparatus used in the terminal may be located in the modem subsystem. The modem subsystem may be implemented by a chip. The chip includes at least one processing element and an interface circuit. The processing element is configured to perform the steps in any method performed by the terminal. The interface circuit is configured to communicate with another apparatus. In an implementation, units of the terminal that implement the steps in the foregoing methods may be implemented by a processing element scheduling a program. For example, a communication apparatus used in the terminal includes a processing element and a storage element. The processing element invokes a program stored in the storage element, to perform the methods performed by the terminal in the foregoing method embodiments. The storage element may be a storage element located on a same chip as the processing element, namely, an on-chip storage element.

In another implementation, a program used to perform the methods performed by the terminal in the foregoing methods may be in a storage element that is located on a different chip from the processing element, namely, an off-chip storage element. In this case, the processing element invokes or loads the program from the off-chip storage element to the on-chip storage element, to invoke and perform the methods performed by the terminal in the foregoing method embodiments.

In still another implementation, units of the terminal that implement the steps in the foregoing methods may be configured as one or more processing elements. These processing elements are disposed on the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing methods may be integrated, and implemented in a form of a SOC. The SOC chip is configured to implement the foregoing methods. At least one processing element and a storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by invoking a program by the processing element, and functions of some units may be implemented by the integrated circuit.

It can be learned that the foregoing communication apparatus used in the terminal may include at least one processing element and an interface circuit. The at least one processing element is configured to perform any method performed by the terminal provided in the foregoing method embodiments. The processing element may perform some or all steps performed by the terminal in a first manner, that is, by invoking a program stored in the storage element; or may perform some or all steps performed by the terminal in a second manner, that is, by combining instructions and an integrated logic circuit of hardware in the processor element. Certainly, some or all steps performed by the terminal may be alternatively performed by combining the first manner and the second manner.

As described above, the processing element herein may be a general-purpose processor, for example, a CPU, or may be configured as one or more integrated circuits, for example, one or more ASICs, one or more microprocessors DSPs, one or more FPGAs, or a combination of at least two of these integrated circuit forms.

The storage element may be one memory, or may be a general term of a plurality of storage elements.

Figure 9:
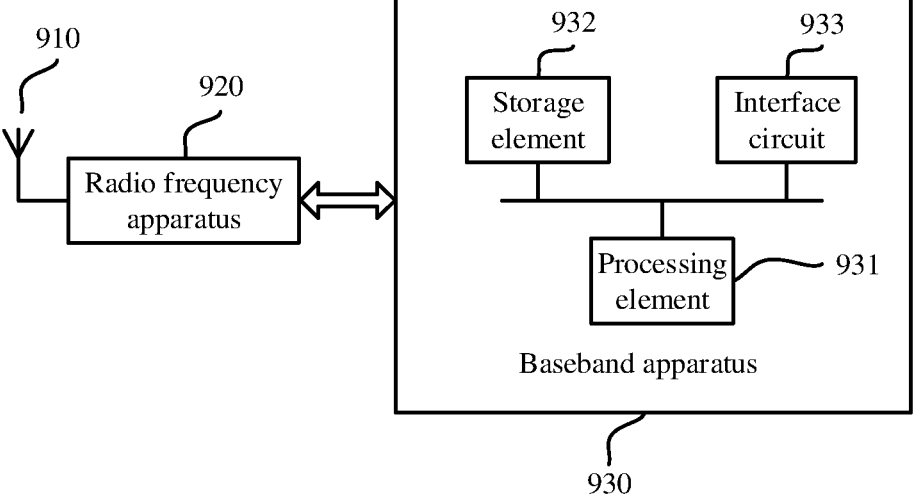
FIG. 9 is a schematic diagram of a structure of a network device according to an embodiment of this disclosure.

FIG. 9 is a schematic diagram of a structure of a network device according to an embodiment of this disclosure. The network device is configured to implement operations of the network device in the foregoing embodiments. As shown in FIG. 9, the network device includes an antenna 910, a radio frequency apparatus 920, and a baseband apparatus 930. The antenna 910 is connected to the radio frequency apparatus 920. In an uplink direction, the radio frequency apparatus 920 receives, through the antenna 910, information sent by a terminal, and sends, to the baseband apparatus 930 for processing, the information sent by the terminal. In a downlink direction, the baseband apparatus 930 processes information about the terminal, and sends the processed information to the radio frequency apparatus 920. The radio frequency apparatus 920 processes the information about the terminal, and then sends the processed information to the terminal through the antenna 910.

The baseband apparatus 930 may include one or more processing elements 931, for example, include a main control CPU and another integrated circuit. In addition, the baseband apparatus 930 may further include a storage element 932 and an interface circuit 933. The storage element 932 is configured to store a program and data. The interface circuit 933 is configured to exchange information with the radio frequency apparatus 920. The interface circuit may be a common public radio interface (CPRI). The foregoing communication apparatus used in the network device may be located in the baseband apparatus 930. For example, the foregoing communication apparatus used in the network device may be a chip on the baseband apparatus 930. The chip includes at least one processing element and an interface circuit. The processing element is configured to perform the steps in any method performed by the network device. The interface circuit is configured to communicate with another apparatus.

In an implementation, units of the network device that implement the steps in the foregoing methods may be implemented by a processing element scheduling a program. For example, an apparatus used in the network device includes a processing element and a storage element. The processing element invokes a program stored in the storage element, to perform the methods performed by the network device in the foregoing method embodiments. The storage element may be a storage element located on a same chip as the processing element, namely, an on-chip storage element; or may be a storage element that is located on a different chip from the processing element, namely, an off-chip storage element.

In another implementation, units of the network device that implement the steps in the foregoing methods may be configured as one or more processing elements. The processing elements are disposed on the baseband apparatus 930. The processing element herein may be an integrated circuit, for example, one or more ASICs, one or more DSPs, one or more FPGAs, or a combination of the types of integrated circuits. These integrated circuits may be integrated together to form a chip.

Units of the network device that implement the steps in the foregoing methods may be integrated together, and implemented in a form of a system-on-a-chip. For example, the baseband apparatus includes the SOC chip, configured to implement the foregoing methods performed by the network device. At least one processing element and a storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any method performed by the network device provided in the foregoing method embodiments. The processing element may perform some or all steps performed by the network device in a first manner, that is, by invoking a program stored in the storage element; or may perform some or all steps performed by the network device in a second manner, that is, by combining instructions and an integrated logic circuit of hardware in the processor element. Certainly, some or all steps performed by the network device may be alternatively performed by combining the first manner and the second manner.

As described above, the processing element herein may be a general-purpose processor, for example, a CPU, or may be configured as one or more integrated circuits, for example, one or more ASICs, one or more microprocessors DSPs, one or more FPGAs, or a combination of at least two of these integrated circuit forms.

The storage element may be one memory, or may be a general term of a plurality of storage elements.

It should be noted that, unless otherwise specified, "I" in this disclosure means "or". For example, A/B may represent A or B. The term "and/or" in this disclosure describes only an association relationship for describing associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Further, "at least one . . . " means one or any combination of subsequent associated objects. For example, "at least one of A, B, and C" includes a case: A, B, C, AB, AC, BC, or ABC. Determining Y based on X does not mean that Y is determined based on only X, and Y may be further determined based on X and other information.

It should be noted that the terms "first" and "second" are merely intended for a purpose of description, and shall not be understood as an indication or implication of relative importance or implicit indication of a quantity of indicated technical features. Therefore, a feature limited by "first" or "second" may explicitly indicate or implicitly include one or more such features. The terms "include", "comprise", "have", and their variants all mean "include but are not limited to", unless otherwise specifically emphasized in another manner.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication apparatus comprising a processor and an interface circuit, wherein the processor is configured to: communicate with another apparatus through the interface circuit, and perform at least the following:

receiving minimization of drive tests (MDT) configuration information from a network device, wherein the MDT configuration information comprises an MDT measurement parameter;

performing MDT on a shared spectrum based on the MDT configuration information to obtain a measurement report; and sending the measurement report to the network device;

wherein the measurement report comprises listen before talk (LBT) failure information and the LBT failure information comprises sidelink LBT failure information; wherein the sidelink LBT failure information comprises a sidelink LBT failure indication and time information and location information that correspond to the sidelink LBT failure indication, and a sidelink LBT failure rate and time information and location information that correspond to the sidelink LBT failure rate.

2. The apparatus according to claim 1, wherein the LBT failure information further comprises uplink LBT failure information.

3. The apparatus according to claim 2, wherein the uplink LBT failure information comprises an uplink LBT failure indication and/or an uplink LBT failure rate;

and/or the sidelink LBT failure information comprises a sidelink LBT failure indication and/or a sidelink LBT failure rate.

4. The apparatus according to claim 1, wherein the measurement report further comprises one or more of the following information:

indication information, indicating whether a first cell whose signal quality is better than that of a currently camped cell exists, wherein the first cell and the currently camped cell belong to different operators;

operator information, indicating an operator to which a cell with best signal quality belongs; or signal quality information, indicating signal quality of a second cell, wherein the second cell comprises at least one of the following various cells: the cell with best signal quality, a cell of an operator that a terminal is allowed to access, and a cell in a cell measurement allowlist of a terminal in a radio resource control (RRC) idle mode or an RRC inactive mode.

5. The apparatus according to claim 1, wherein the measurement report further comprises one or more of the following information: operator identification information, radio access type (RAT) identification information, frequency band identification information, or cell identification information.

6. The apparatus according to claim 1, wherein the MDT configuration information comprises an enable indication that indicates whether to enable performing MDT on the shared spectrum.

7. The apparatus according to claim 1, wherein the MDT measurement parameter further comprises one or more of the following information:

a time indication, indicating time of performing MDT on the shared spectrum;

a location indication, indicating a location at which MDT is performed on the shared spectrum; or a frequency band indication, indicating the shared spectrum or at least two subbands comprised in the shared spectrum.

8. The apparatus according to claim 1, wherein the LBT failure information comprises a quantity of times of unsuccessful preamble sending caused by an LBT failure.

9. The apparatus according to claim 1, wherein the MDT measurement parameter comprises a first enable indication (X3), wherein the first enable information indicates whether to enable obtaining of the LBT failure information.

10. A communication apparatus comprising a processor and an interface circuit, wherein the processor is configured to: communicate with another apparatus through the interface circuit, and perform at least the following:

sending minimization of drive tests (MDT) configuration information to a terminal; and receiving a measurement report from the terminal;

wherein the measurement report comprises listen before talk (LBT) failure information and the LBT failure information comprises sidelink LBT failure information; wherein the sidelink LBT failure information comprises a sidelink LBT failure indication and time information and location information that correspond to the sidelink LBT failure indication, and a sidelink LBT failure rate and time information and location information that correspond to the sidelink LBT failure rate.

11. The apparatus according to claim 10, wherein the LBT failure information further comprises uplink LBT failure information.

12. The apparatus according to claim 11, wherein the uplink LBT failure information comprises an uplink LBT failure indication and/or an uplink LBT failure rate;

and/or the sidelink LBT failure information comprises a sidelink LBT failure indication and/or a sidelink LBT failure rate.

13. The apparatus according to claim 10, wherein the measurement report further comprises one or more of the following information:

indication information, indicating whether a first cell whose signal quality is better than that of a currently camped cell exists, wherein the first cell and the currently camped cell belong to different operators;

operator information, indicating an operator to which a cell with best signal quality belongs; or signal quality information, indicating signal quality of a second cell, wherein the second cell comprises at least one of the following various cells: the cell with best signal quality, a cell of an operator that a terminal is allowed to access, and a cell in a cell measurement allowlist of a terminal in a radio resource control (RRC) idle mode or an RRC inactive mode.

14. The apparatus according to claim 10, wherein the measurement report further comprises one or more of the following information: operator identification information, radio access type RAT identification information, frequency band identification information, or cell identification information.

15. The apparatus according to claim 10, wherein the MDT configuration information comprises an enable indication that indicates whether to enable performing MDT on the shared spectrum.

16. The apparatus according to claim 10, wherein the MDT measurement parameter further comprises one or more of the following information:

a time indication, indicating time of performing MDT on the shared spectrum;

a location indication, indicating a location at which MDT is performed on the shared spectrum; or a frequency band indication, indicating the shared spectrum or at least two subbands comprised in the shared spectrum.

17. The apparatus according to claim 10, wherein the measurement report further comprises identification information of a first network device; and the receiving of the measurement report from the terminal comprises: receiving the measurement report sent by a second network device to the first network device, wherein the measurement report is sent by the terminal to the second network device, and the measurement report further comprises the identification information of the first network device.

18. The apparatus according to claim 10, wherein the LBT failure information comprises a quantity of times of unsuccessful preamble sending caused by an LBT failure.

19. The apparatus according to claim 10, wherein the MDT measurement parameter comprises a first enable indication (X3), wherein the first enable information indicates whether to enable obtaining of the LBT failure information.

20. A method comprising:

sending, by a network device, minimization of drive tests (MDT) configuration information;

receiving, by a terminal device, the minimization of drive tests (MDT) configuration information from the network device;

performing, by the terminal device, MDT on a shared spectrum based on the MDT configuration information to obtain a measurement report; and sending, by the terminal device, the measurement report to the network device;

wherein the measurement report comprises listen before talk (LBT) failure information and the LBT failure information comprises sidelink LBT failure information; wherein the sidelink LBT failure information comprises a sidelink LBT failure indication and time information and location information that correspond to the sidelink LBT failure indication, and a sidelink LBT failure rate and time information and location information that correspond to the sidelink LBT failure rate.

* * * * *